(12) United States Patent
Lee

(10) Patent No.: US 11,201,479 B2
(45) Date of Patent: Dec. 14, 2021

(54) METHOD AND APPARATUS WITH BATTERY MANAGEMENT

(71) Applicant: Samsung Electronics Co., Ltd., Suwon-si (KR)

(72) Inventor: Sun-Jae Lee, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 270 days.

(21) Appl. No.: 16/368,971

(22) Filed: Mar. 29, 2019

(65) Prior Publication Data

US 2020/0119564 A1 Apr. 16, 2020

(30) Foreign Application Priority Data

Oct. 11, 2018 (KR) .................. 10-2018-0120833

(51) Int. Cl.
*H02J 7/00* (2006.01)
*H01M 10/44* (2006.01)

(52) U.S. Cl.
CPC ......... *H02J 7/0021* (2013.01); *H01M 10/441* (2013.01); *H01M 2220/20* (2013.01)

(58) Field of Classification Search
USPC ......................................... 320/134
See application file for complete search history.

(56) References Cited

U.S. PATENT DOCUMENTS

| 6,523,626 | B2 | 2/2003 | Wakashiro et al. |
| 9,819,544 | B2 | 11/2017 | Gagnon et al. |
| 2018/0145521 | A1* | 5/2018 | Hwang ................ G01R 31/389 |
| 2019/0237816 | A1* | 8/2019 | Kim ........................ B60L 58/12 |
| 2019/0265304 | A1* | 8/2019 | Kim ........................ B60L 50/50 |
| 2020/0119564 | A1* | 4/2020 | Lee ....................... H02J 7/0018 |

FOREIGN PATENT DOCUMENTS

| KR | 10-2010-0097504 A | 9/2010 |
| KR | 10-2013-0085203 A | 7/2013 |
| KR | 10-2013-0101457 A | 9/2013 |
| KR | 10-1360825 B1 | 2/2014 |
| KR | 10-2014-0073949 A | 6/2014 |
| KR | 10-1406685 B1 | 6/2014 |
| KR | 10-2017-0092552 A | 8/2017 |

* cited by examiner

*Primary Examiner* — Mohammed Alam
(74) *Attorney, Agent, or Firm* — NSIP Law

(57) ABSTRACT

A battery management method and apparatus is disclosed. The battery management method of a master device includes transmitting, upon a determination of not receiving sensing data of a reference battery cell among a plurality of battery cells included in a first battery module, a request for the sensing data of the reference battery cell to a head slave device of a second battery module, and receiving the sensing data of the reference battery cell from the head slave device of the second battery module, wherein the sensing data of the reference battery cell is transferred through a tail slave device of the first battery module and a tail slave device of the second battery module.

20 Claims, 12 Drawing Sheets

METHOD AND APPARATUS WITH BATTERY MANAGEMENT

CROSS-REFERENCE TO RELATED APPLICATIONS

This application claims the benefit under 35 USC § 119(a) of Korean Patent Application No. 10-2018-0120833 filed on Oct. 11, 2018 in the Korean Intellectual Property Office, the entire disclosure of which is incorporated herein by reference for all purposes.

BACKGROUND

1. Field

The following description relates to a method and an apparatus with battery management.

2. Description of Related Art

As an example, a typical battery management system manages a battery corresponding to a power source. When the sensing data of a battery is insufficiently acquired, the battery management system may not accurately manage the battery.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a battery management method of a master device includes transmitting, upon a determination of not receiving sensing data of a reference battery cell among a plurality of battery cells included in a first battery module, a request for the sensing data of the reference battery cell to a head slave device of a second battery module, and receiving the sensing data of the reference battery cell from the head slave device of the second battery module, wherein the sensing data of the reference battery cell is transferred through a tail slave device of the first battery module and a tail slave device of the second battery module.

The request may be transmitted to a slave device corresponding to the reference battery cell through slave devices included in the second battery module.

The plurality of battery cells may be respectively connected to slave devices and each of the slave devices may be configured to transfer sensing data generated by sensing the corresponding battery cell to an adjacent slave device.

The slave devices corresponding to the plurality of battery cells may be adjacently disposed to one another in a row to communicate wirelessly.

A tail slave device of the first battery module is adjacently disposed to a tail slave device of the second battery module to communicate wirelessly.

The wireless communication transmits using a shortwave short-distance frequency.

The second battery module may be selected from battery modules managed by the master device based on a degree of adjacency to the first battery module.

The second battery module may be selected from battery modules managed by the master device based on a state of communication between internal slave devices.

One of battery modules of which sensing data of internal battery cells is received in the master device may be selected to be the second battery module.

The slave device corresponding to the reference battery cell may be configured to transmit the request and the sensing data of the reference battery cell based on a non-blocking communication scheme.

The slave device corresponding to the reference battery cell may be configured to receive the request, transfer the request to a slave device corresponding to an adjacent reference battery cell, sense the corresponding reference battery cell in response to the request without waiting until the sensing data is received from the slave device corresponding to the adjacent reference battery cell, and transmit the sensing data to a slave device to another adjacent reference battery cell.

The request may include identification information of the first battery module and identification information of the second battery module.

Position information of a plurality of battery cells included in each of a plurality of battery modules managed by the master device may be stored in an arrangement table and the arrangement table may be updated with information associated with a replacement with a new battery cell or a positional change of of the plurality of battery cells included in each of the battery modules.

In another general aspect, a battery management method of a tail slave device includes determining, upon receiving a request for sensing data from an adjacent slave device in a same battery module, whether to transfer the request to a tail slave device of an adjacent battery module, transferring, in response to a determination that the request is transferred, the request to the tail slave device of the adjacent battery module, and transferring, upon sensing data of a reference battery cell being received from the tail slave device of the adjacent battery module, the sensing data to the adjacent slave device in the same battery module.

The transferring of the request to the tail slave device of the adjacent battery module may include transferring the request to the tail slave device of the adjacent battery module without sensing a corresponding battery cell.

The determining of whether to transfer the request may include determining whether to transfer the request based on whether the request includes identification information of a reference battery cell of which sensing data is not received in a master device and identification information of a first battery module including the reference battery cell.

In still another general aspect, a master device includes a processor configured to transmit, upon a determination of not receiving sensing data of a reference battery cell among a plurality of battery cells included in a first battery module, a request for the sensing data of the reference battery cell to a head slave device of a second battery module instead of the first battery module and receive the sensing data of the reference battery cell from the head slave device of the second battery module, and wherein the sensing data of the reference battery cell is transferred through a tail slave device of the first battery module and a tail slave device of the second battery module.

The master device may include a memory configured to store instructions. The processor may be further configured to execute the instructions to configure the processor to: transmit, upon the determination of not receiving sensing data of the reference battery cell among the plurality of battery cells included in the first battery module, the request for the sensing data of the reference battery cell to the head slave device of the second battery module; and receive the sensing data of the reference battery cell from the head slave device of the second battery module.

Other features and aspects will be apparent from the following detailed description, the drawings, and the claims.

Figure 1:
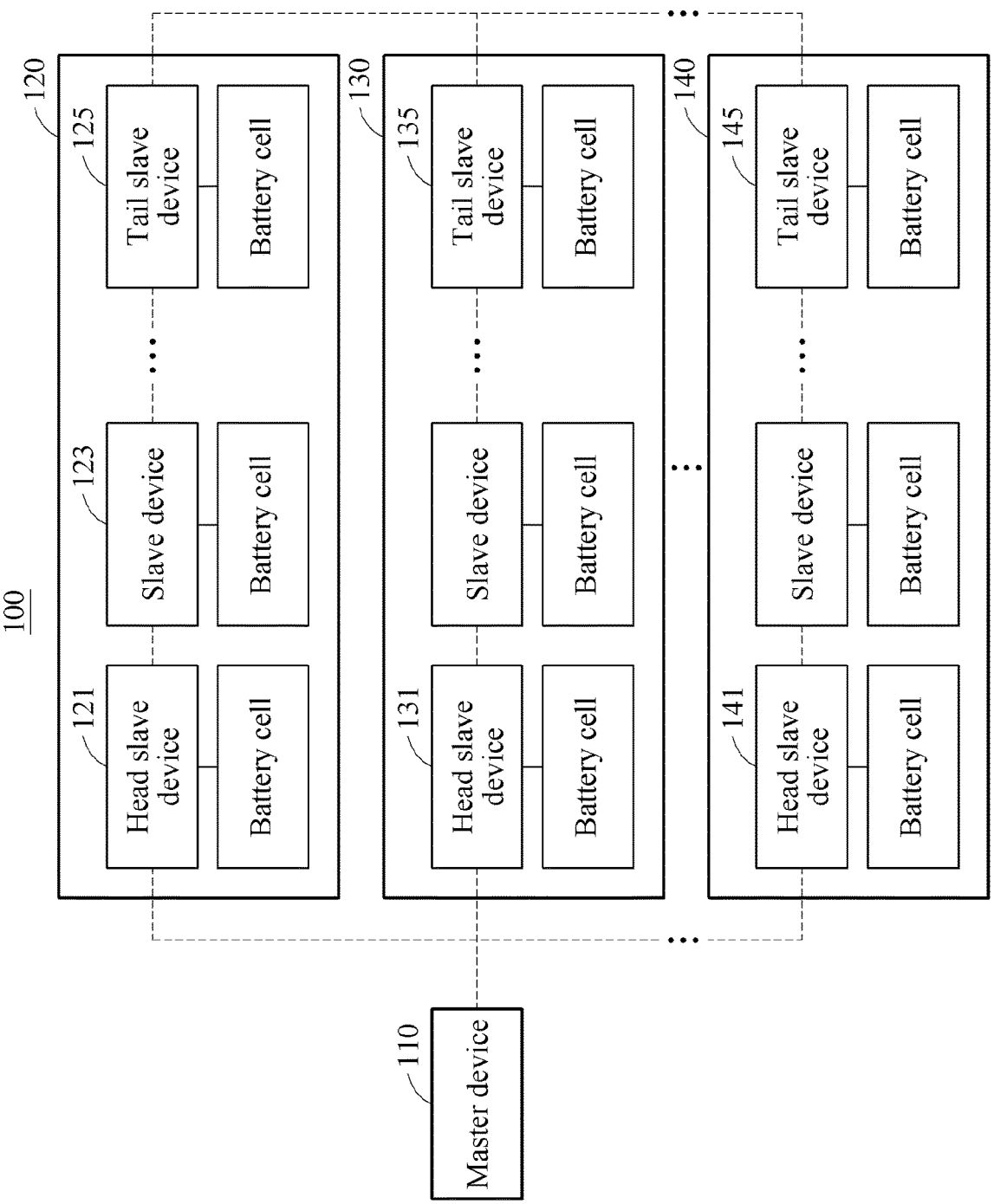
FIG. 1 illustrates an example of a battery system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of some features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood to which this disclosure pertains and in view of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

FIG. 1 is a diagram illustrating an example of a battery system.

A battery system 100 may include a master device 110, a plurality of slave devices 121, 123 through 125, 131, 135, 141, and 145, and a plurality of corresponding battery cells.

The master device 110 may be a master battery management system (BMS) device to manage a plurality of battery modules 120, 130, and 140, as non-limiting examples. For example, the master device 110 may determine a state of a battery cell using sensing data of the battery cell received from the plurality of slave devices 121, 123 through 125, 131, 135, 141, and 145. The state of the battery cell includes, for example, a state of charge (SoC) and a state of health (SoH) of a battery. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Each of the plurality of slave devices 121, 123 through 125, 131, 135, 141, and 145 is a slave BMS device to manage a corresponding battery cell. For example, each of the plurality of slave devices 121, 123 through 125, 131, 135, 141, and 145 senses a corresponding battery cell in response to a request from the master device 110 and transfers sensing data to the master device 110. Each of the plurality of slave devices 121, 123 through 125, 131, 135, 141, and 145 is connected to the corresponding battery cell to sense the corresponding battery cell and generate sensing data. The sensing data includes, for example, any one or any combination of any two or more of voltage data, current data, and temperature data, as non-limiting examples.

A battery module includes a plurality of battery cells. Each of the battery modules 120, 130, and 140 includes a plurality of battery cells. Although FIG. 1 illustrates three battery modules for brevity of description, embodiments are not limited thereto. One or more battery modules may be included in a single battery pack.

In each of the battery modules 120, 130, and 140, a plurality of slave devices may be arranged in a row. Neighboring slave devices may transmit and receive data, for example, a request and sensing data to and from each other through wireless communication. The wireless communication is, for example, a shortwave short-distance communication.

Among the plurality of slave devices, the slave devices 121, 131, and 141 are, for example, head slave devices. The head slave devices 121, 131, and 141 may be disposed closest to the master device 110 to directly communicate with the master device 110. Also, the slave devices 125, 135, and 145 are, for example, tail slave devices. The tail slave devices 125, 135, and 145 may be disposed in a tail portion of corresponding battery modules to lastly receive the request from the master device 110.

In FIG. 1, a wireless communication path is indicated by a dashed line. The master device 110 wirelessly communicates with the head slave devices 121, 131, and 141 of the plurality of battery modules 120, 130, and 140. In the battery module 120, the head slave device 121 wirelessly communicates with the slave device 123 adjacently disposed to the head slave device 121. Also, the slave device 123 wirelessly communicates with a slave device adjacently disposed to the slave device 123. The tail slave device 125 wirelessly communicates with the tail slave device 135 of an adjacent battery module, for example, the battery module 130. Related description will be made with the drawings below.

FIGS. 2 through 6 are diagrams illustrating examples of an operation of a battery management apparatus.

Figure 2:
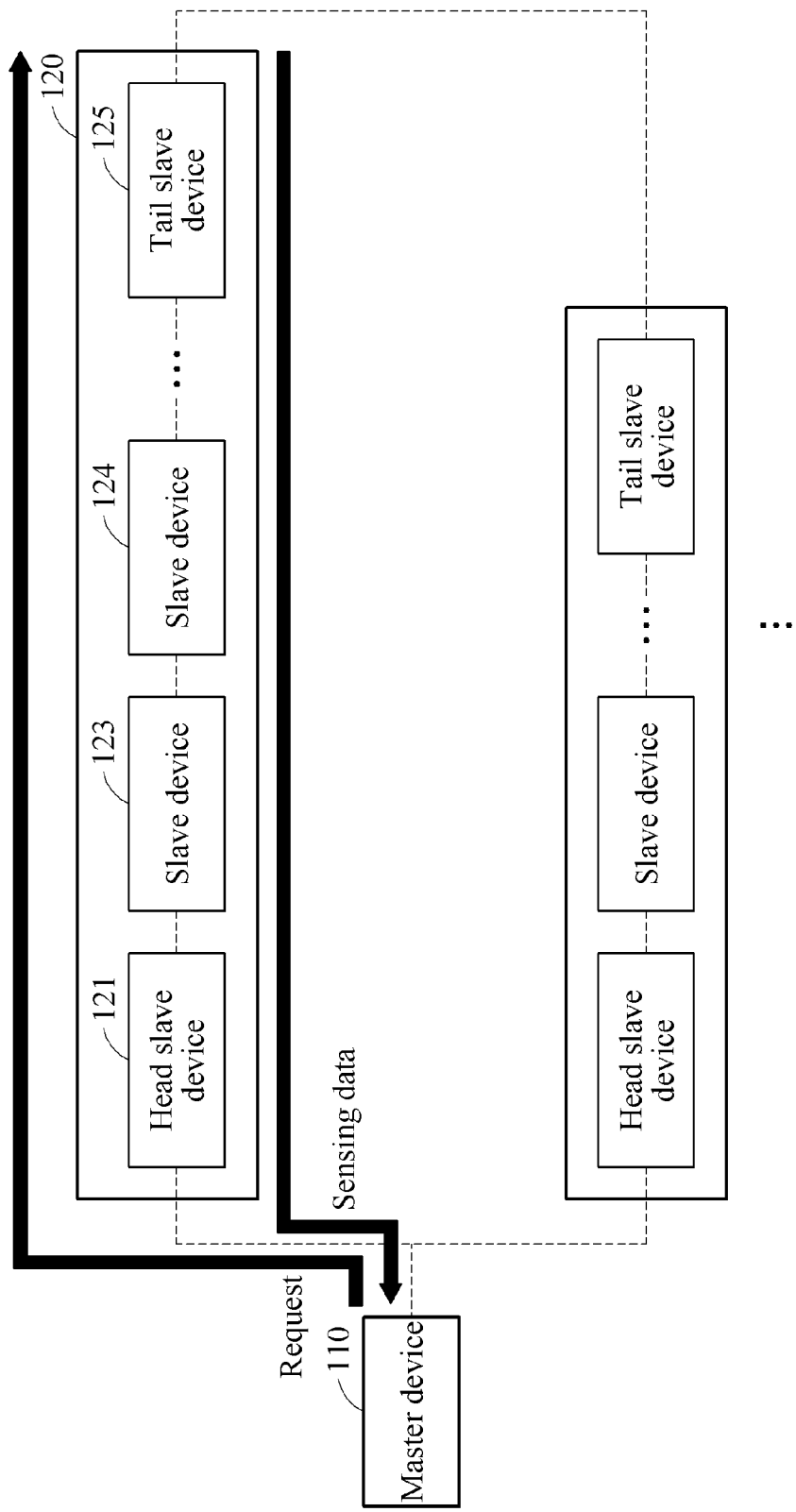
FIGS. 2 through 6 illustrate examples of an operation of a battery management apparatus.

FIG. 2 illustrates an example of a basic communication scheme of the master device 110 and the plurality of slave devices 121, 123, 124, and 125. The master device 110 may serially or sequentially communicate with the plurality of slave devices 121, 123, 124, and 125. For ease of explanation, battery cells corresponding to each of the plurality of slave devices are omitted in FIGS. 2 through 6.

In an example, the master device 110 transmits a request for sensing data to the head slave device 121 of the battery module 120. The head slave device 121 transfers the received request to the slave device 123 adjacently disposed in the battery module 120. Also, the head slave device 121 generates sensing data by sensing a corresponding battery cell and transmits the sensing data to the master device 110.

The slave device 123 transfers the request received from the head slave device 121 to the neighboring slave device 124 in the battery module 120, generates sensing data of a corresponding battery cell, and transfers the sensing data to the head slave device 121. The head slave device 121 transfers the sensing data received from the slave device 123 to the master device 110.

Likewise, the request is serially or sequentially transferred from the slave device 124 to the tail slave device 125. In this example, since the tail slave device 125 is located in a tail end portion of the battery module 120, the tail slave device 125 does not transfer the request to another slave device even when the request is received from a neighboring slave device in the battery module 120. However, in another example, the tail slave device 125 may exceptionally transfer the request to another slave device, which will be further described in detail with reference to the drawings below. The tail slave device 125 generates sensing data of a corresponding battery cell in response to the request and transmits the sensing data to an adjacent slave device.

As such, the master device 110 and the plurality of slave devices 121, 123, 124, and 125 transmit and receive sensing data through wireless communication performed between two neighboring devices. Although the basic communication scheme is described based on the battery module 120 for the brevity of description, such a communication scheme may be identically applicable to other battery modules.

Figure 3:
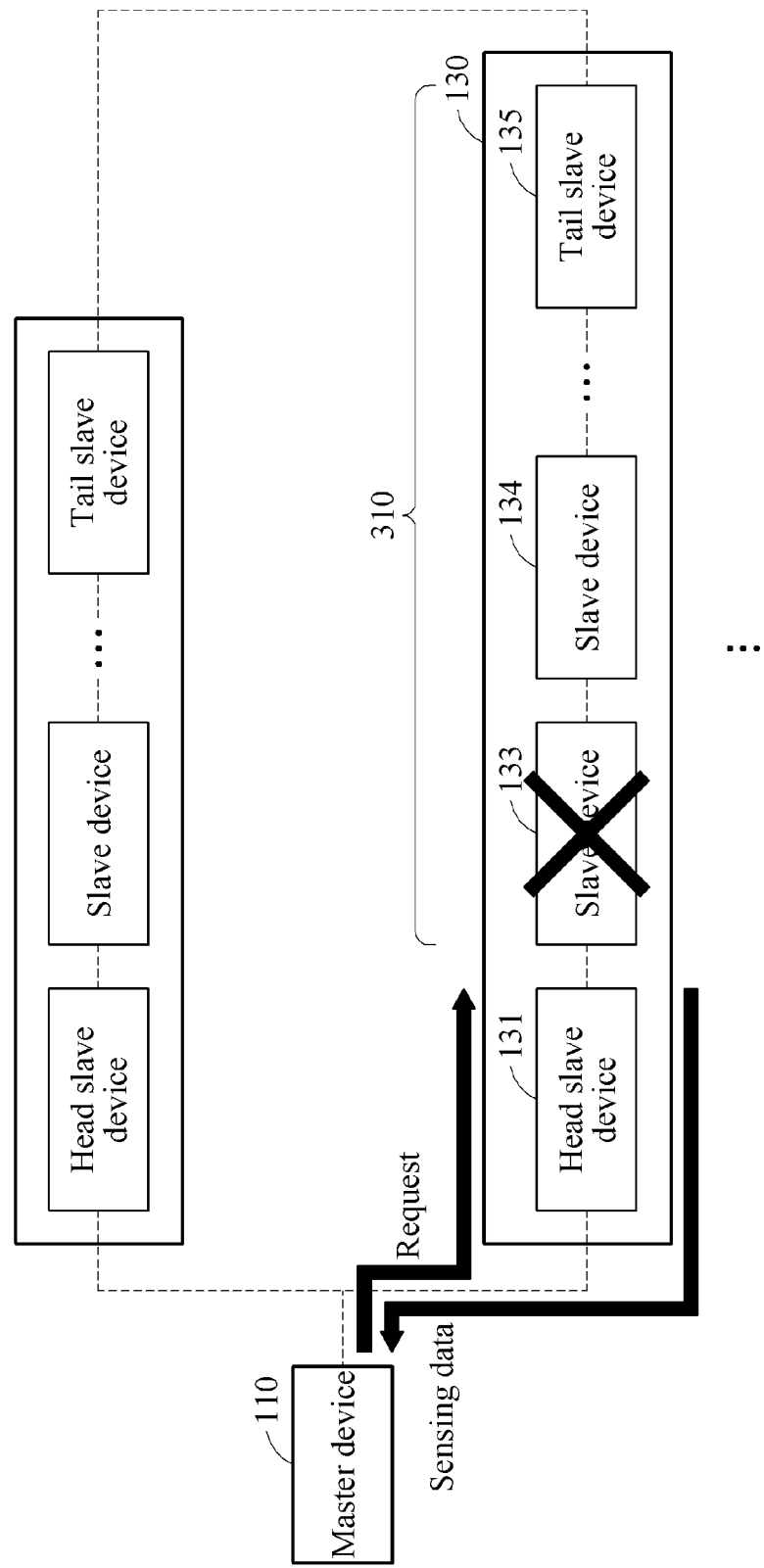

FIG. 3 illustrates an example of a communication scheme performed when a malfunction or failure occurs in a portion of a plurality of slave devices. In the example of FIG. 3, an example may be where the malfunction or failure occurs in the slave device 133 of the battery module 130.

The master device 110 transmits a request for sensing data to the head slave device 131 to acquire sensing data of battery cells included in the battery module 130. The head slave device 131 transfers the received request to an adjacent slave device, for example, the slave device 133, senses a corresponding battery cell, and transmits sensing data to the master device 110. Due to a malfunction or failure, the slave device 133 may abnormally receive the request from the head slave device 131. In this example, because the request is not received, the slave device 133 does not transfer the request to the slave device 134 adjacent to the slave device 133. Thus, the request transmitted from the master device 110 may be forwarded to a slave device, for example, slave device 134, prior to the slave device 133 in which the malfunction or failure occurs. Also, in an example, only the slave device receiving the request may transmit the sensing data to the master device 110.

The master device 110 may not receive sensing data from all of the battery cells included in the battery module 130. A battery cell from which sensing data is not received is referred to as a reference battery cell. In FIG. 3, a group 310 indicates slave devices corresponding to the reference battery cell.

The master device 110 verifies sensing data received in a predetermined period of time to determine whether the sensing data of all of the battery cells included in the battery module 130 is received. When it is determined that the sensing data of all of the battery cells included in the battery module 130 is not received, the master device 110 dynamically changes the communication path to transmit a request for sensing data of the reference battery cell. Related description will be made with reference to FIG. 4.

Figure 4:
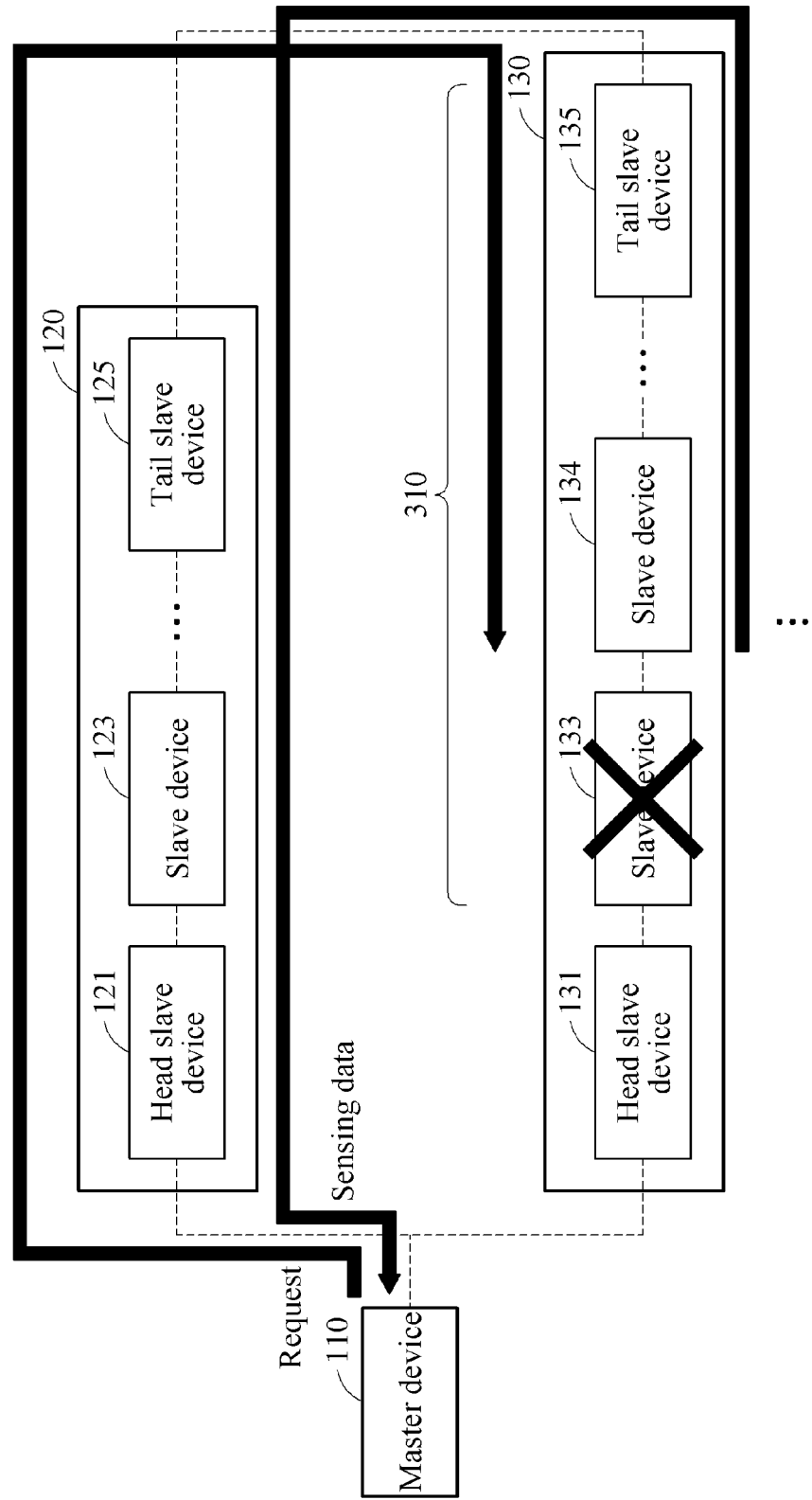

FIG. 4 illustrates an example of a communication scheme that enables reception of sensing data of a reference battery cell. In the example of FIG. 4, an example may be where a malfunction or failure occurs in the slave device 133 of the battery module 130. Also, the group 310 indicates slave devices corresponding to the reference battery cell.

The master device 110 transmits a request for sensing data of the reference battery cell to a head slave device of one of another of the battery modules excluding the battery module 130. In this example, the request is different from the request described with reference to FIG. 3 and further includes identification information of the reference battery cell and identification information of the battery module including the reference battery cell. In the example of FIG. 4, it is assumed that the reference for the sensing data is transmitted from the reference battery cell to the head slave device 121 of the battery module 120.

The plurality of slave devices 121, 123, and 125 in the battery module 120 transfers the request received from the master device 110 to the tail slave device 125. In this example, each of the plurality of slave devices 121, 123, and 125 transfers the request to an adjacent slave device and does not sense a corresponding battery cell. The corresponding battery cell is not sensed because the sensing data of the plurality of battery cells included in the battery module 120 has been previously transferred to the master device 110. The tail slave device 125 identifies the battery module 130 to which the request is to be transferred based on the identification information of the battery module included in the received request, and transfers the request to the tail slave device 135 of the battery module 130.

Based on the identification information of the battery module included in the received request, the tail slave device 135 determines whether to transfer the request to a tail slave device of an adjacent battery module or an adjacent slave device in the battery module 130 corresponding to a same battery module. When it is determined that the request is transferred to an adjacent slave device in the battery module 130, the tail slave device 135 transfers the request to the adjacent slave device in the battery module 130 based on the identification information of the reference battery cell included in the request. Also, when the tail slave device 135 verifies a corresponding battery cell is the reference battery cell based on the identification information of the reference battery cell, the tail slave device 135 generates sensing data by sensing the corresponding battery cell and transfers the sensing data to the tail slave device 125 of the battery module 120. The sensing data transferred to the tail slave device 125 is transferred to the master device 110 through the plurality of slave devices 121, 123, and 125 included in the battery module 120.

In the battery module 130, the request is transferred up to the slave device 134 through wireless communication performed by neighboring slave devices. When the slave device 134 verifies that a corresponding battery cell is the reference battery cell based on the identification information of the reference battery cell included in the request, the slave device 134 generates sensing data by sensing the corresponding battery cell in response to the request. Also, the sensing data is transferred to the master device 110 through the plurality of slave devices 134 and 135 in the battery module 130 and the plurality of slave devices 121, 123, and 125 in the battery module 120.

Since the slave device 133 in which the malfunction or failure occurs did not receive the request from the slave device 134, the request terminates at the slave device 134 and the response sent to the master device 110 would not include the sensing data of a battery cell corresponding to the slave device 133.

As such, when a malfunction or failure occurs in one of the slave devices serially connected, the master device 110 may dynamically change a communication path to the slave devices instead of repetitively using a predetermined communication path, thereby effectively acquiring the sensing data of the reference battery cell.

Hereinafter, a communication scheme used in a case in which the malfunction or failure occurs in a communication path between two slave devices will be described in detail with reference to FIGS. 5 and 6.

Figure 5:
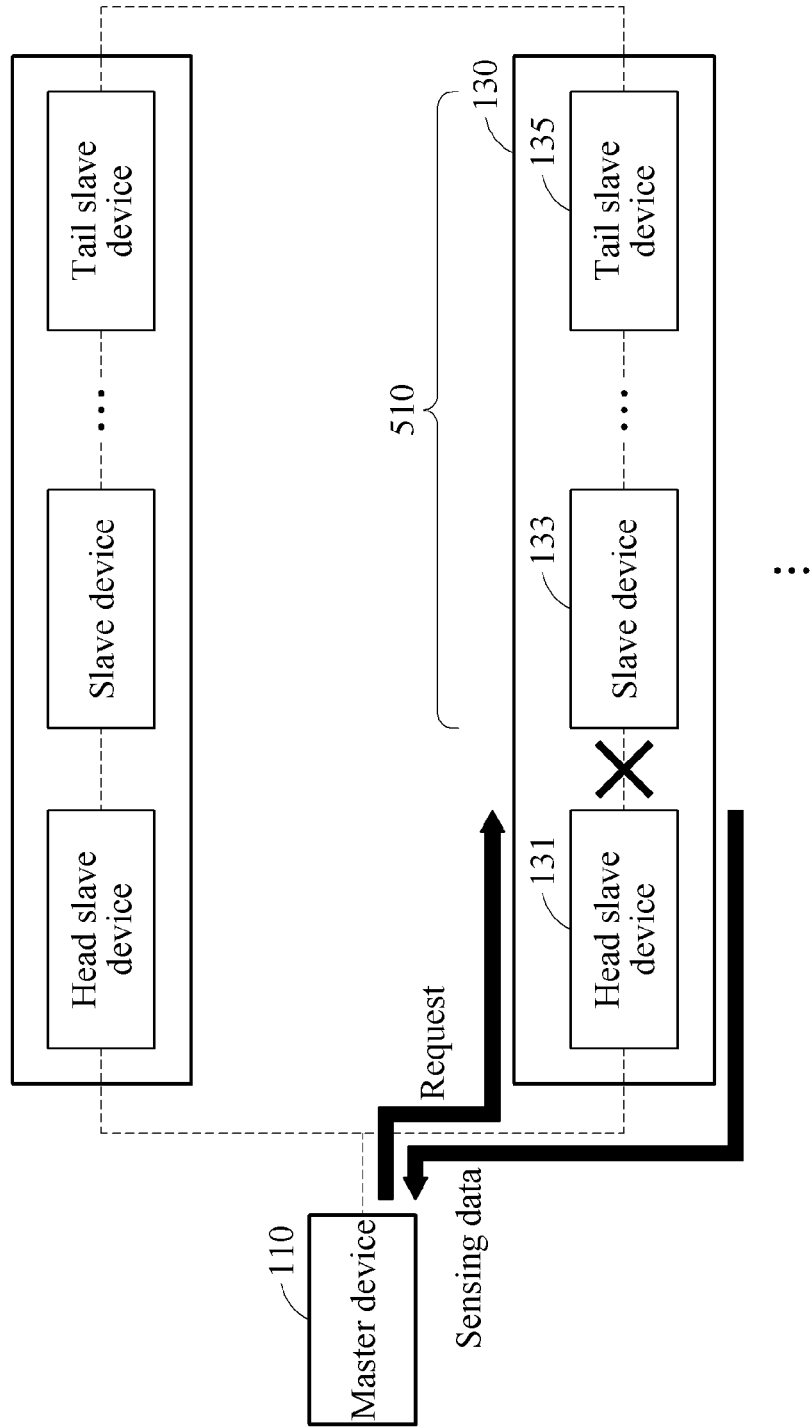

FIG. 5 illustrates an example of a communication scheme performed when malfunction or failure occurs in a portion of the communication path between two slave devices in a same battery module. In the example of FIG. 5, a case in which the malfunction or failure occurs in a communication path between slave devices 131 and 133 in the battery module 130 is depicted.

The master device 110 transmits a request to the head slave device 131 to acquire sensing data of battery cells included in the battery module 130. The head slave device 131 transfers the received request to an adjacent slave device, for example, the slave device 133, generates sensing data of a corresponding battery cell, and transfers the sensing data to the master device 110.

Due to a malfunction or failure occurring in the communication path connecting the head slave device 131 and the slave device 133, the slave device 133 may not receive the request from the head slave device 131 even when the slave device 133 operates normally. In this example, sensing data of a corresponding battery cell is not transferred to the master device 110. Also, since the slave device 133 did not transfer the request to an adjacent slave device, the request is not received by the slave device 133 through the tail slave device 135 in the battery module 130 and sensing data is not transferred to the master device 110.

The master device 110 may not receive sensing data from all of the battery cells included in the battery module 130. A battery cell from which sensing data is not received is referred to as a reference battery cell. In FIG. 5, a group 510 indicates slave devices corresponding to the reference battery cell.

The master device 110 verifies sensing data received within a predetermined period of time to determine whether the sensing data of all of the battery cells included in the battery module 130 is received. When it is determined that the sensing data of all of the battery cells included in the battery module 130 is not received, the master device 110 transmits a request for sensing data of the reference battery cell. Related description will be made with reference to FIG. 6.

Figure 6:
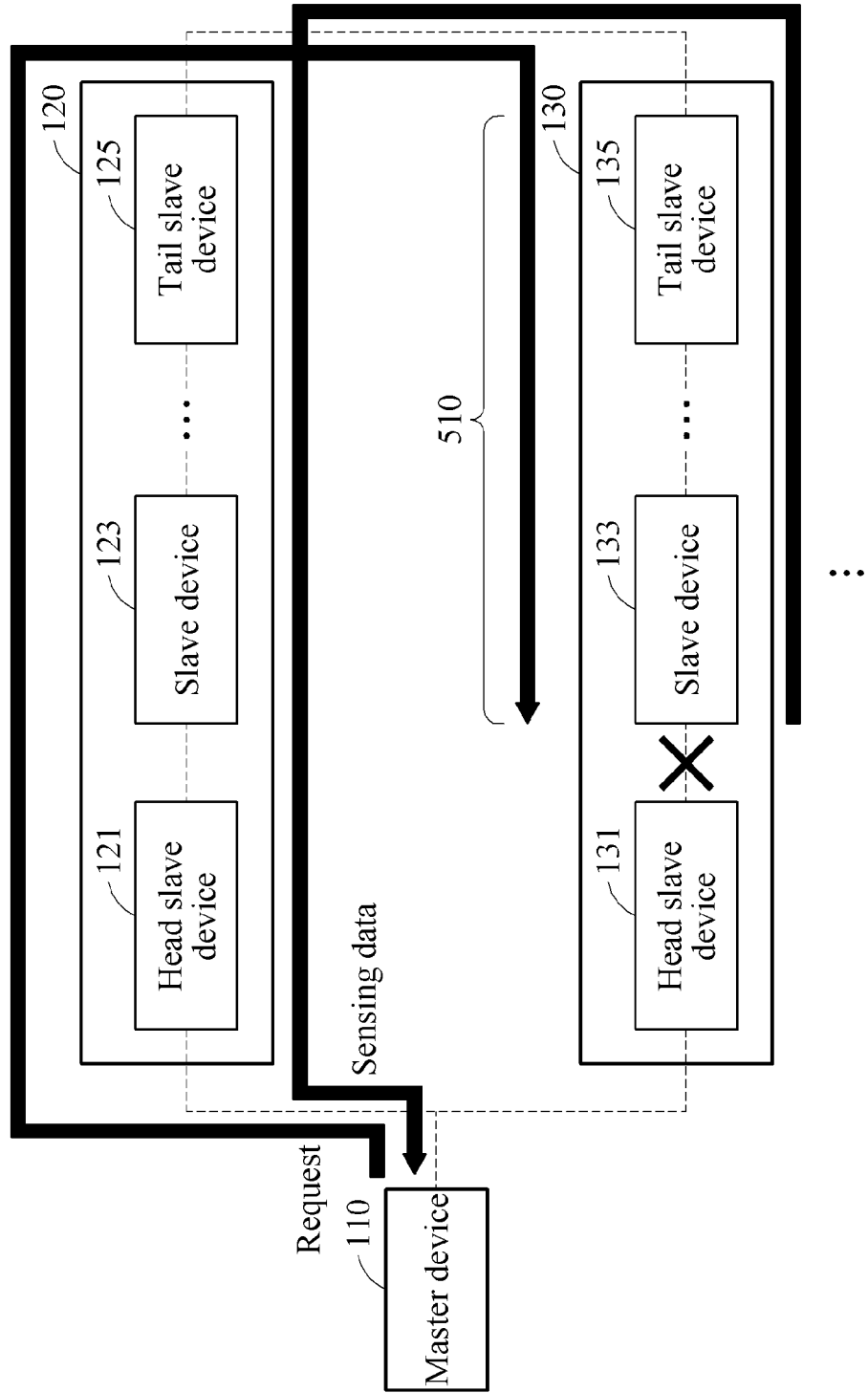

FIG. 6 illustrates an example of a communication scheme that enables reception of the sensing data of a reference battery cell. In the example of FIG. 6, it is assumed that a malfunction or failure occurs in the communication path between the head slave device 131 and the slave device 133 in the battery module 130. Also, the group 510 indicates slave devices corresponding to the reference battery cell.

The master device 110 transmits a request for sensing data of the reference battery cell to a head slave device of another one of battery modules excluding the battery module 130. In this example, the request is different from the request described with reference to FIG. 5 and further includes identification information of the reference battery cell and identification information of a battery module including the reference battery cell. In the example of FIG. 6, it is assumed that the reference for the sensing data is transmitted from the reference battery cell to the head slave device 121 of the battery module 120.

The request from the master device 110 is transferred to the tail slave device 125 through the plurality of slave devices 121, 123, and 125 in the battery module 120. In this example, each of the plurality of slave devices 121, 123, and 125 transfers the request to an adjacent slave device and does not sense a corresponding battery cell because the sensing data of the plurality of battery cells included in the battery module 120 has been previously transferred to the master device 110. The tail slave device 125 identifies the battery module 130 to which the request is to be transferred based on the identification information of a battery module included in the received request, and transfers the request to the tail slave device 135 of the battery module 130.

Based on the identification information of the battery module included in the received request, the tail slave device 135 determines whether to transfer the request to a tail slave device of an adjacent battery module or an adjacent slave device in the battery module 130 corresponding to a same battery module. When it is determined that the request is transferred to an adjacent slave device in the battery module 130, the tail slave device 135 transfers the request to the adjacent slave device in the battery module 130 based on the identification information of the reference battery cell included in the request. Also, when the tail slave device 135 verifies a corresponding battery cell is the reference batter cell based on the identification information of the reference battery cell, the tail slave device 135 generates sensing data by sensing the corresponding battery cell and transfers the sensing data to the tail slave device 125 of the battery module 120. The sensing data transferred to the tail slave device 125 is transferred to the master device 110 through the plurality of slave devices 121, 123, and 125 included in the battery module 120.

In the battery module 130, the request is transferred up to the slave device 133 through wireless communication performed by neighboring slave devices. When the slave device 133 verifies that a corresponding battery cell is the reference battery cell based on the identification information of the reference battery cell included in the request, the slave device 133 generates sensing data by sensing the corresponding battery cell in response to the request. Also, the sensing data is transferred to the master device 110 through the plurality of slave devices 133 and 135 in the battery module 130 and the plurality of slave devices 121, 123, and 125 in the battery module 120.

In the example of FIG. 6, since the malfunction or failure occurs in the communication path between the two slave devices 131 and 133, the master device 110 may receive the sensing data of all of the battery cells included in the battery module 130 based on the aforementioned communication scheme.

As such, when a malfunction or failure occurs in a portion of a communication path, the master device 110 may dynamically change the communication path instead of repetitively using the predetermined communication path, thereby effectively acquiring the sensing data of the reference battery cell.

Figure 7:
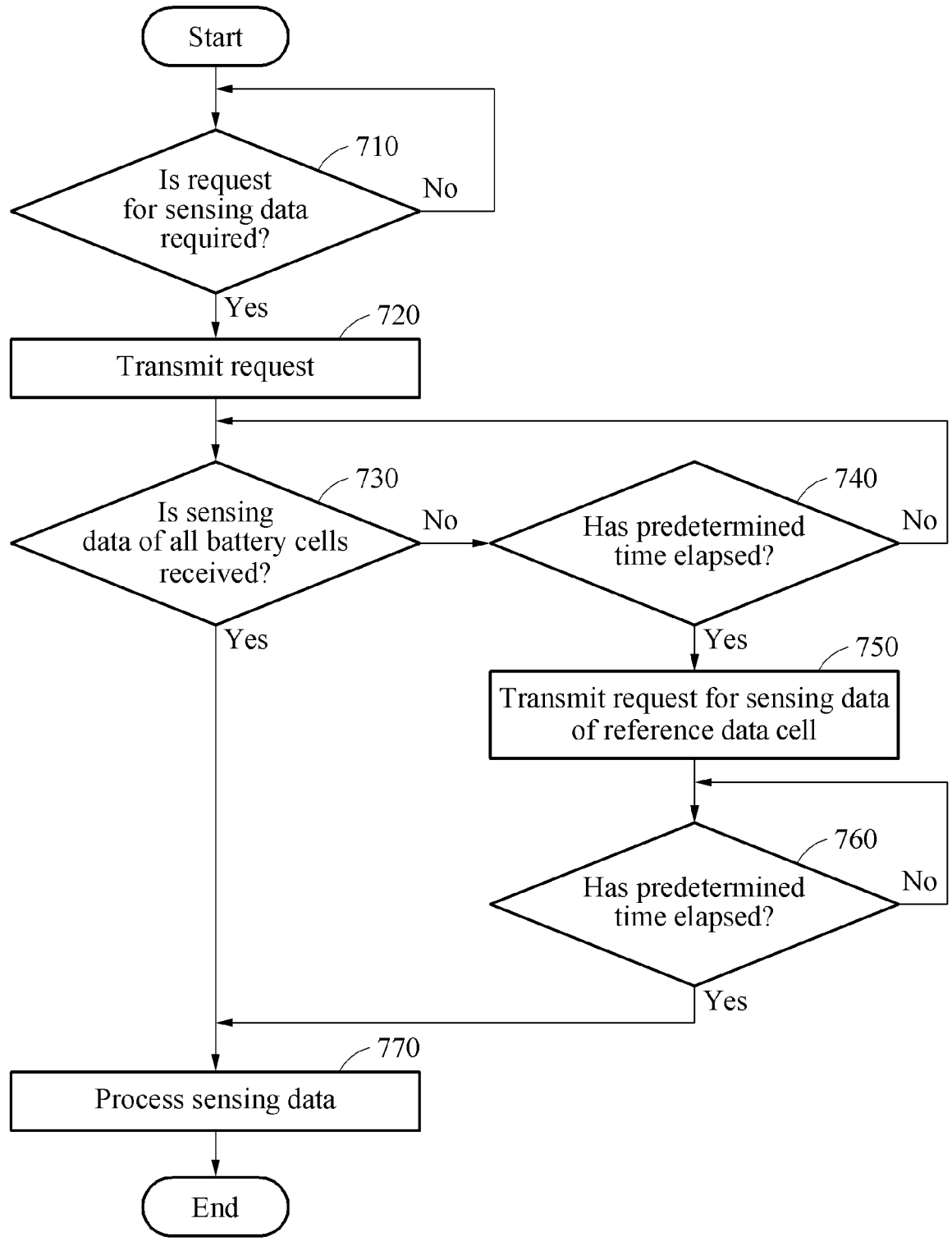
FIGS. 7 and 8 illustrate examples of a battery management method.
Figure 8:
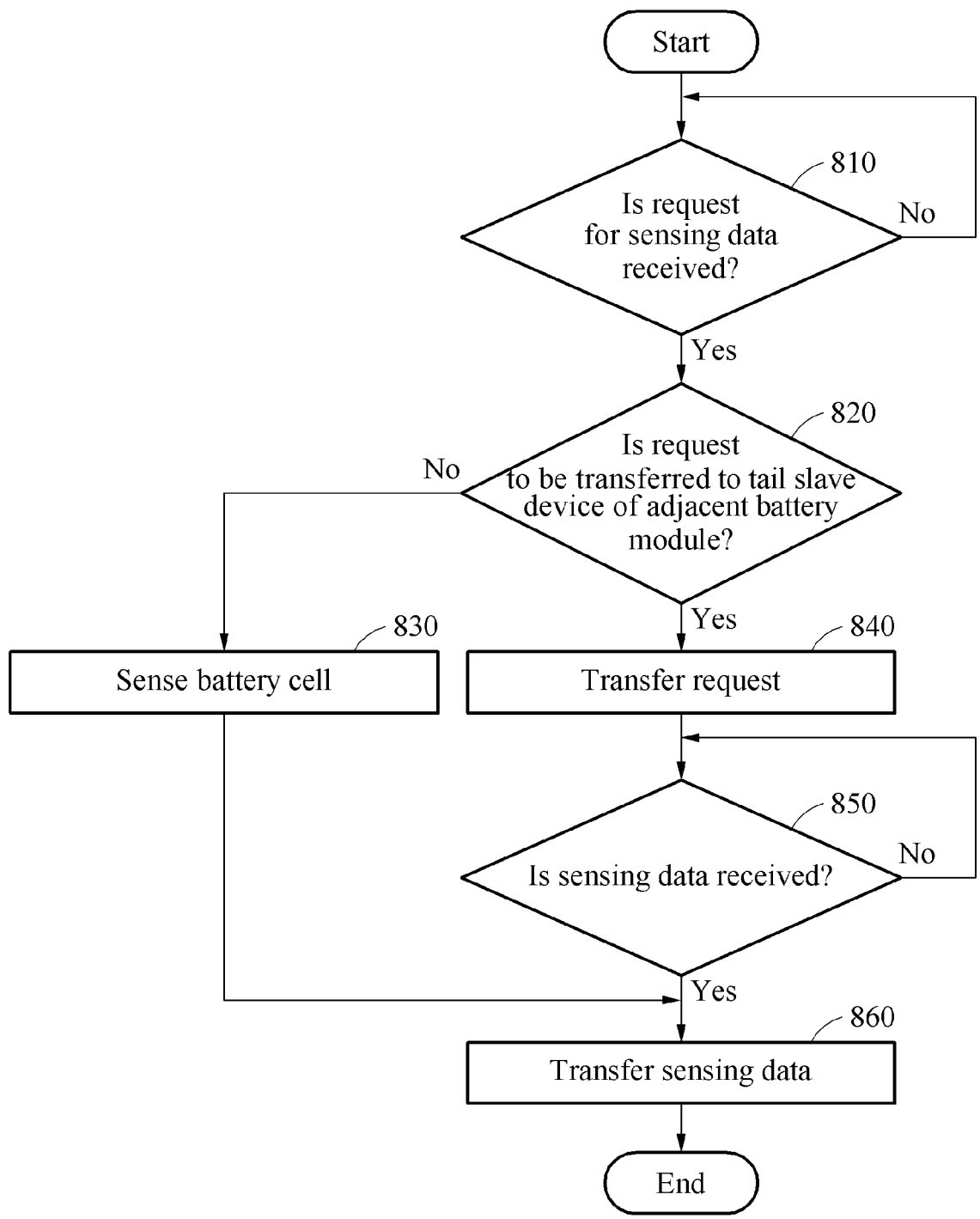

FIGS. 7 and 8 are diagrams illustrating examples of a battery management method.

Referring to FIG. 7, a battery management method is performed by a processor included in a master device.

In operation 710, the master device determines whether a request for sensing data is required. For example, the master device determines whether a slave device is connected, whether sensing data is to be received from the connected slave device, and/or whether a predetermined time has elapsed from a point in time at which the sensing data is received. When the predetermined time has elapsed from a point in time, the master device determines that the request for sensing data is required.

In operation 720, the master device transmits the request for sensing data. For example, the master device transmits the request for the sensing data to a head slave device of one of a plurality of battery modules. When sensing data of battery cells included in the corresponding battery module is received, the master device may transmit the request to a head slave device of another battery module. The master device may also transmit the request for sensing data to a head slave device of each of the plurality of battery modules irrespective of whether the sensing data is received.

In operation 730, the master device determines whether sensing data of all battery cells are received. When the sensing data of all battery cells are not received, operation 740 is performed.

In operation 740, the master device determines whether a predetermined time has elapsed. Here, the predetermined time is a period allocated for receiving sensing data after the master device transmits the request. When the predetermined time has not elapsed, operation 730 is performed again.

When the predetermined time has elapsed, for example, when the sensing data of all battery cells are not received and the predetermined time has elapsed, operation 750 is performed.

In operation 750, the master device transmits a request for sensing data of a reference data cell. Here, the reference data cell is a data cell in which sensing data is not received in advance.

The master device selects a second battery module, instead of a first battery module including the reference data cell from the plurality of battery modules, and transmits the request for the sensing data of the reference data cell to a head slave device of the second battery module.

In one example, the master device selects the second battery module from the plurality of battery modules based on a degree of adjacency to the first battery module. In this example, as the degree of adjacency to the first battery module increases, the request for the sensing data of the reference data cell may be promptly transferred to a slave device corresponding to the reference battery cell. The master device selects a battery module disposed closest to the first battery module as the second battery module from the plurality of battery modules.

In another example, the master device selects the second battery module from the plurality of battery modules based on a state of communication between internal slave devices because the request may be slowly delivered or not delivered in a battery module in which internal slave devices communicate poorly. The master device selects a battery module in which internal slave devices perform communication in the best condition as the second battery from the plurality of battery modules.

In another example, the master device selects one of the battery modules of which sensing data of all internal battery cells is received in the master device, as the second battery module. When sensing data of all internal battery cells of a battery module is not received in the master device, the battery module may have a slave device or a communication path in which the malfunction or failure occurs, and the request may be erroneously transferred through the battery module. Thus, the master device selects the second battery module from only the battery modules in which the sensing data of all the internal battery cells are received in the master device.

Any one or a combination of the above-described examples for selecting the second battery module may be applied to the master device, and any other example that efficiently selects the second battery module may be applied without limitation.

In operation 760, the master device determines whether the predetermined time has elapsed. When the predetermined time has not elapsed, the master device receives the sensing data of the reference battery cell. When the predetermined time has elapsed, operation 770 is performed.

In operation 770, the master device processes the received sensing data. The master device determines states of battery cells based on the received sensing data.

The description made with reference to FIGS. 1 through 6 may be applicable to the operations of FIG. 7 and a detailed description is omitted.

Referring to FIG. 8, a battery management method is performed by a processor included in a tail slave device.

In operation 810, a tail slave device determines whether a request for sensing data is received from an adjacent slave device in a same battery module. When it is determined that the request for sensing data is not received, operation 810 is performed again. When it is determined that the request for the sensing data is received, operation 820 is performed.

In operation 820, the tail slave device determines whether to transfer the request to a tail slave device of an adjacent battery module. For example, the tail slave device determines whether to transfer the request to a tail slave device of an adjacent battery module based on whether the request includes identification information of a reference battery cell and identification information of a battery module including the reference battery cell. When the request includes the identification information of the reference battery cell and the identification information of a battery module including the reference battery cell, the tail slave device determines that the request is transferred to the tail slave device of the adjacent battery module.

In this example, the adjacent battery module to which the request is transferred to the tail slave device may be a battery module indicated by the identification information included in the request, or a battery module located on a communication path connected to the battery module indicated by the identification information included in the request.

When it is determined that the request is not transferred, operation 830 is performed.

In operation 830, the tail slave device senses a corresponding battery cell to generate sensing data. When the request is not transferred to the tail slave device of the adjacent battery module, the request may be a request for sensing data of a battery cell corresponding to the tail slave device.

When it is determined that the request is transferred in operation 820, operation 840 is performed.

In operation 840, the tail slave device transfers the request to the tail slave device of the adjacent battery module. In this example, the tail slave device transfers the request without sensing the corresponding battery cell. The request may be transferred through a wireless communication path between the tail slave device and the tail slave device of the adjacent battery module.

In operation 850, the tail slave device determines whether the sensing data is received from the tail slave device of the adjacent battery module. Here, the sensing data is the sensing data of the reference battery cell. When the sensing data is not received, operation 850 is performed again.

When the sensing data is received from the tail slave device of the adjacent battery module, operation 860 is performed.

In operation 860, the tail slave device transfers the sensing data to an adjacent slave device in the same battery module. The sensing data is transferred to a head slave device through wireless communication between neighboring slave devices in the same battery module. The head slave device transfers the sensing data to a master device.

The description made with reference to FIGS. 1 through 6 may be applicable to the operations of FIG. 8 and, thus, further a detailed description is omitted.

Figure 9:
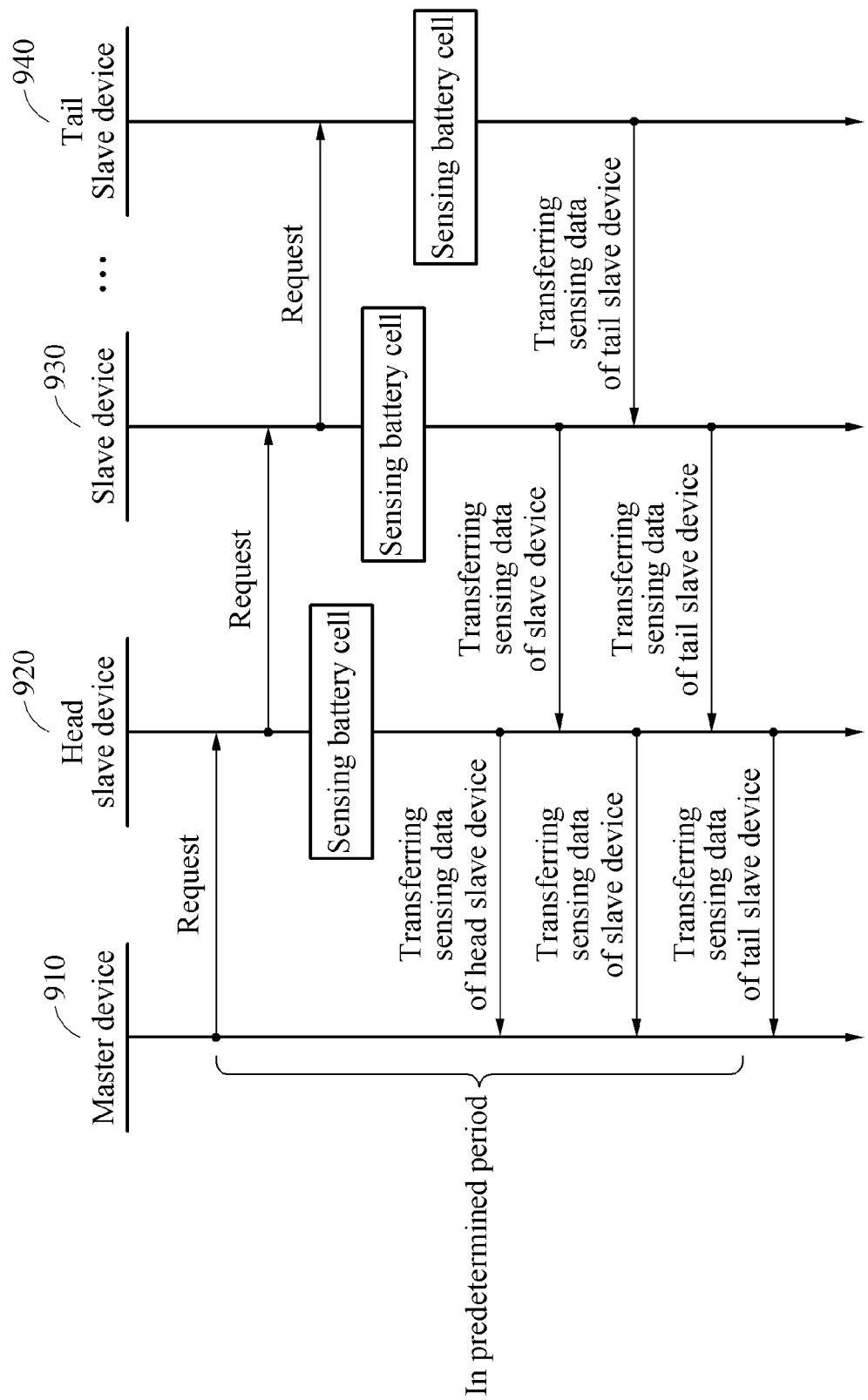
FIG. 9 illustrates an example of a non-blocking communication scheme.

FIG. 9 is a diagram illustrating an example of a non-blocking communication scheme.

A master device 910 and a plurality of slave devices 920, 930, and 940 transmit and receive data, for example, a request and sensing data, to and from each other based on a non-blocking communication scheme. The plurality of slave devices 920, 930, and 940 may be included in a same battery module.

The master device 910 transmits a request for sensing data to a head slave device, for example, the slave device 920. In this example, the head slave device 920 may be a slave device disposed most adjacent to the master device 910 among slave devices in the same battery module and perform wireless communication directly or point-to-point with the master device 910.

The head slave device 920 transfers the request received from the master device 910 to the slave device adjacent to the head slave device 920. The head slave device 920 generates sensing data by sensing a corresponding battery cell. The head slave device 920 transfers the sensing data to the master device 910. Also, when the sensing data is received from the adjacent slave device 930, the head slave device 920 transfers the received sensing data to the master device 910.

The head slave device 920 transfers the request to the adjacent slave device 930 and then measures the corresponding battery cell without waiting for reception of the sensing data from the adjacent slave device 930 to transfers the sensing data to the master device 910. Such communication scheme may be referred to as the non-blocking communication scheme. Based on the non-blocking communication scheme, latency may be minimized even when a wireless communication is used.

Although the non-blocking communication scheme is described based on the head slave device 920 for ease of explanation, the non-blocking communication scheme may be applied to other slave devices as well. Basically, a tail slave device, for example, the slave device 940 disposed at the end in a battery module measures a corresponding battery cell and transmits sensing data to an adjacent slave device instead of transferring the request to another slave device.

The master device 910 operates in a reception mode for a predetermined period of time from a point in time at which a request for sensing data is transmitted to receive the sensing data. The master device 910 determines whether sensing data of all the battery cells included in a battery module is received based on the sensing data received in the predetermined period of time. Based on a determination result, the aforementioned operations may be performed.

Figure 10:
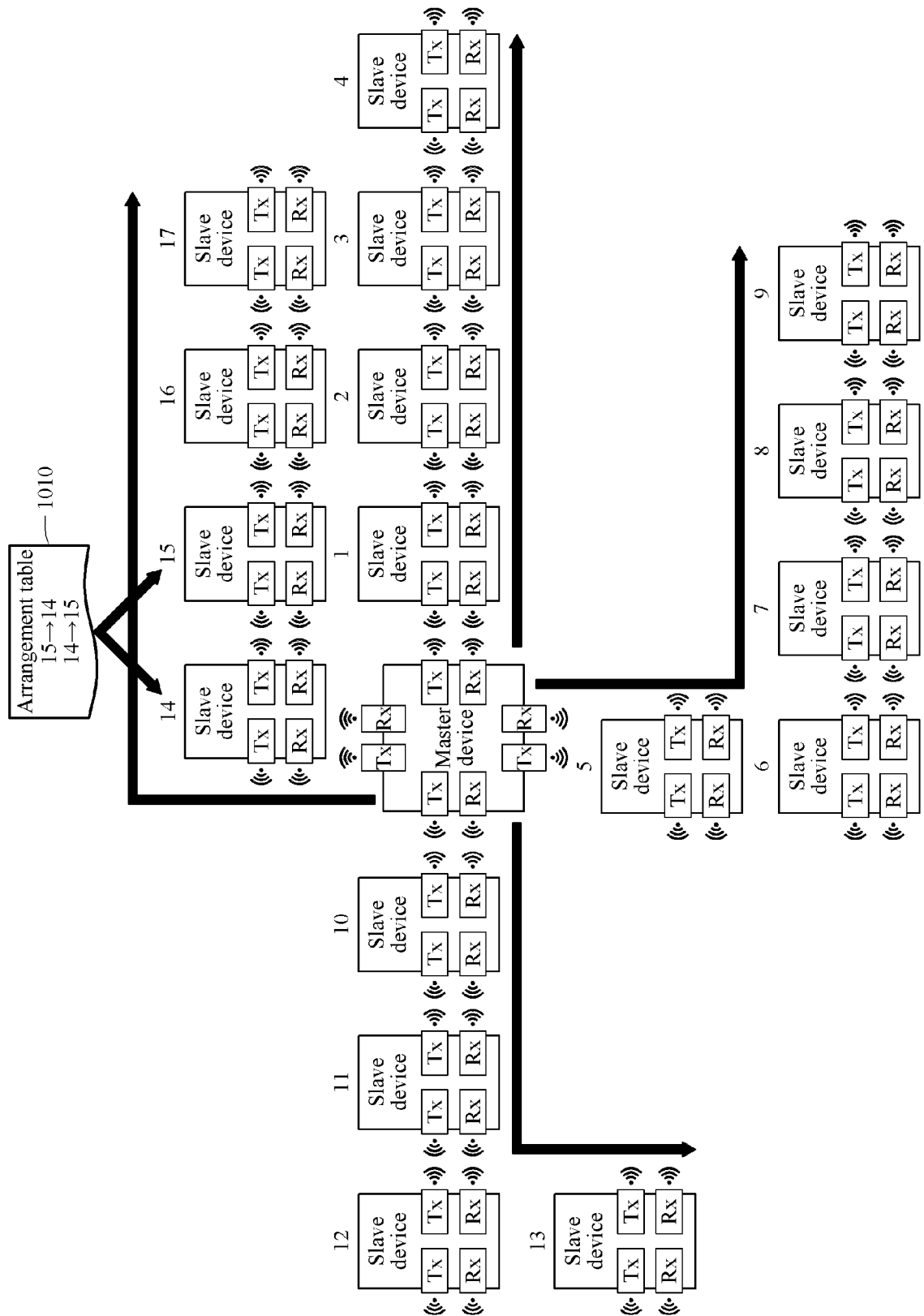
FIG. 10 illustrates an example of an arrangement table.

FIG. 10 is a diagram illustrating an example of an arrangement table.

A master device stores position information of a plurality of battery cells included in each of a plurality of battery modules in an arrangement table 1010. FIG. 10 illustrates an example for explaining the arrangement table. In FIG. 10, a number indicated on each slave device is information for identifying a battery cell corresponding to the slave device.

In one example, a $14^{th}$ battery cell and a $15^{th}$ battery cell may be displaced from each other for various reasons. Such positional change is updated in the arrangement table 1010 and managed by the master device.

In another example, when the performance of a battery cell is significantly reduced and/or is no longer available, the battery cell may be replaced with another battery cell. Such replacement is also be updated in the arrangement table 1010 and managed by the master device.

Figure 11:
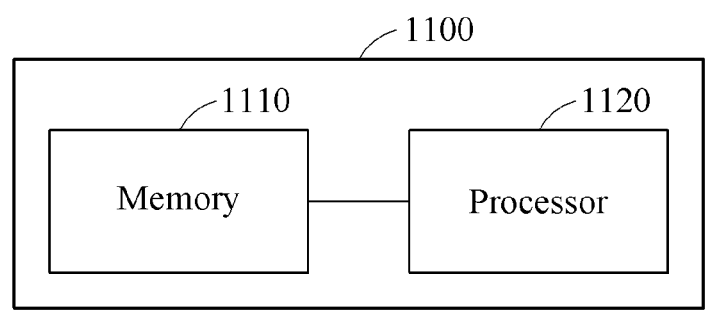
FIG. 11 illustrates an example of a battery management apparatus.

FIG. 11 is a diagram illustrating an example of a battery management apparatus.

In the example of FIG. 11, a battery management apparatus may be a master device or a tail slave device.

In an example, a master device 1100 includes a memory 1110 and a processor 1120.

The memory 1110 includes instructions to be read by a computer. The processor 1120 may perform the aforementioned operations directed by the execution of the instructions stored in the memory 1110. The memory 1110 may be a volatile memory or a non-volatile memory.

When sensing data of at least one reference battery cell among a plurality of battery cells included in a first battery module is not received, the processor 1120 transmits a request for the sensing data of the at least one reference battery cell to a head slave device of a second battery module instead of the first battery module. Also, the processor 1120 receives the sensing data of the at least one reference battery cell from the head slave device of the second battery module. In this example, the sensing data of the at least one reference battery cell is transferred through a tail slave device of the first battery module and a tail slave device of the second battery module.

In addition, the master device 1100 may process the operations described above.

In another example, a tail slave device 1100 includes a memory 1110 and a processor 1120.

The memory 1110 includes instructions to be read by a computer. The processor 1120 performs the aforementioned operations when the instructions stored in the memory 1110 are executed in the processor 1120. The memory 1110 may be a volatile memory or a non-volatile memory.

When a request for sensing data is received from an adjacent slave device in a same battery module, the processor 1120 determines whether to transfer the request to a tail slave device of an adjacent battery module. When it is determined that the request is transferred, the processor 1120 transfers the request to the tail slave device of the adjacent battery module. When sensing data of a reference battery cell is received from the tail slave device of the adjacent battery module, the processor 1120 transfers the sensing data to the adjacent slave device in the same battery module.

In addition, the tail slave device 1100 may process the operations described above.

Figure 12:
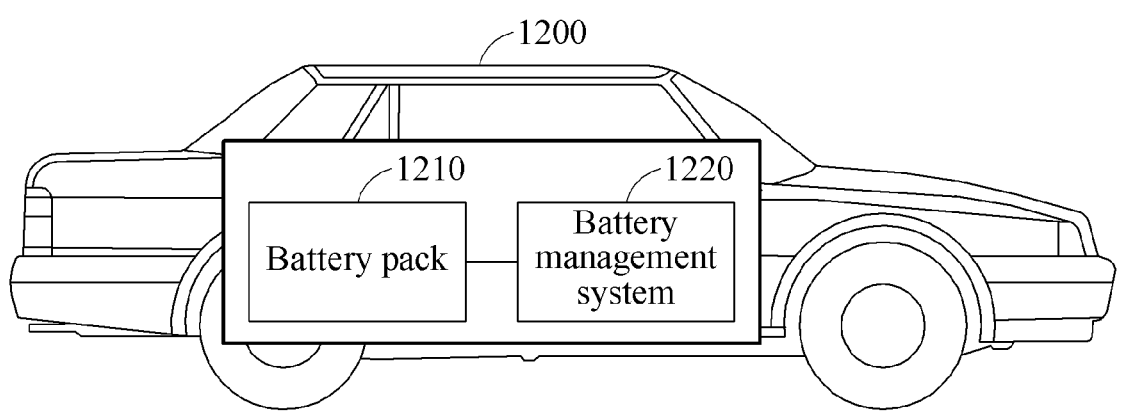
FIG. 12 illustrates an example of a vehicle.

FIG. 12 is a diagram illustrating an example of a vehicle.

Referring to FIG. 12, a vehicle 1200 includes a battery pack 1210 and a battery management system (BMS) 1220. The vehicle 1200 uses the battery pack 1210 as a power source. The vehicle 1200 is, for example, an electric vehicle or a hybrid vehicle The battery pack 1210 includes a plurality of battery modules. A battery module includes a plurality of battery cells.

The BMS 1220 may monitor whether an abnormality occurs in the battery pack 1210 and prevent the battery pack 1210 from being overcharged or over-discharged. The BMS may perform a thermal control on the battery pack 1210 when a temperature of the battery pack 1210 is higher than a first temperature, for example, 40 degrees Celsius (° C.) or is lower than a second temperature, for example, −10° C. The BMS may perform a cell balancing such that states of charge of the battery cells in the battery pack 1210 are equalized.

The BMS 1220 includes a master device and a plurality of slave devices. The BMS 1220 may use the master device and the plurality of slave devices to request and acquire sensing data of a plurality of battery cells included in each of a plurality of battery modules.

The description made with reference to FIGS. 1 through 11 may be applicable to the vehicle 1200 of FIG. 12 and a detailed description is omitted.

The battery system 100, battery modules 120, 130, and 140, master device 110, 910 and 1100, slave devices 121, 123, 125, 131, 135, 141 and 145, 920, 930, and 940, memory 1110, processor 1120, battery pack 1210 and battery management system (BMS) 1220 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery management method of a master device, comprising:
transmitting, upon a determination that sensing data of a reference battery cell among a plurality of battery cells included in a first battery module has not been received by the master device, a request for the sensing data of the reference battery cell to a head slave device of a second battery module; and
receiving the sensing data of the reference battery cell from the head slave device of the second battery module,
wherein the sensing data of the reference battery cell is transferred through a tail slave device of the first battery module and a tail slave device of the second battery module.

2. The battery management method of claim 1, wherein the request is transmitted to a slave device corresponding to the reference battery cell through slave devices included in the second battery module.

3. The battery management method of claim 1, wherein the plurality of battery cells is respectively connected to slave devices, and
each of the slave devices is configured to transfer sensing data generated by sensing a corresponding battery cell to an adjacent slave device.

4. The battery management method of claim 3, wherein the slave devices corresponding to the plurality of battery cells are adjacently disposed to one another in a row and communicate wirelessly between adjacent slave devices.

5. The battery management method of claim 3, wherein a tail slave device of the first battery module is adjacently disposed to a tail slave device of the second battery module and communicates wirelessly with the second battery module.

6. The battery management method of claim 4, wherein the respective wireless communications transmit a short-wave short-distance frequency.

7. The battery management method of claim 1, wherein the second battery module is selected from battery modules managed by the master device based on a degree of adjacency to the first battery module.

8. The battery management method of claim 1, wherein the second battery module is selected from battery modules managed by the master device based on a state of communication between internal slave devices.

9. The battery management method of claim 1, wherein one of battery modules of which sensing data of internal battery cells is received in the master device is selected to be the second battery module.

10. The battery management method of claim 1, wherein the slave device corresponding to the reference battery cell is configured to transmit the request and the sensing data of the reference battery cell based on a non-blocking communication scheme.

11. The battery management method of claim 10, wherein the slave device corresponding to the reference battery cell is configured to receive the request, transfer the request to a slave device corresponding to an adjacent reference battery cell, sense the corresponding reference battery cell in response to the request without waiting until the sensing data is received from the slave device corresponding to the adjacent reference battery cell, and transmit the sensing data to a slave device corresponding to another adjacent reference battery cell.

12. The battery management method of claim 1, wherein the request includes identification information of the first battery module and identification information of the second battery module.

13. The battery management method of claim 1, wherein respective position information of a plurality of battery cells included in each of a plurality of battery modules managed by the master device is stored in an arrangement table, and
   the arrangement table is updated with information associated with a replacement with a new battery cell or a positional change of the plurality of battery cells included in each of the battery modules.

14. A non-transitory computer-readable storage medium storing instructions that, when executed by a processor, cause the processor to perform the battery management method of claim 1.

15. A battery management method of a tail slave device, the method comprising:
   determining, upon receiving a request for sensing data from an adjacent slave device in a same battery module, whether to transfer the request to a tail slave device of an adjacent battery module;
   transferring, in response to the determining of whether to transfer the request to the tail slave device of the adjacent battery module, the request to the tail slave device of the adjacent battery module; and
   transferring, upon sensing data of a reference battery cell being received from the tail slave device of the adjacent battery module, the sensing data to the adjacent slave device in the same battery module.

16. The battery management method of claim 15, wherein the transferring of the request to the tail slave device of the adjacent battery module comprises:
   transferring the request to the tail slave device of the adjacent battery module without sensing a corresponding battery cell.

17. The battery management method of claim 15, wherein the determining of whether to transfer the request comprises:
   determining whether to transfer the request based on whether the request includes identification information of a reference battery cell of which sensing data is not received in a master device and identification information of a first battery module including the reference battery cell.

18. The battery management method of claim 15, wherein a slave device corresponding to the reference battery cell is configured to transmit the request and the sensing data of the reference battery cell based on a non-blocking communication scheme.

19. A master device comprising:
   a processor configured to:
      transmit, upon a determination of not receiving sensing data of a reference battery cell among a plurality of battery cells included in a first battery module, a request for the sensing data of the reference battery cell to a head slave device of a second battery module; and
      receive the sensing data of the reference battery cell from the head slave device of the second battery module,
   wherein the sensing data of the reference battery cell is transferred through a tail slave device of the first battery module and a tail slave device of the second battery module.

20. The master device of claim 19, further comprising a memory configured to store instructions;
   wherein the processor is further configured to execute the instructions to configure the processor to:
      transmit, upon the determination of not receiving sensing data of the reference battery cell among the plurality of battery cells included in the first battery module, the request for the sensing data of the reference battery cell to the head slave device of the second battery module; and
      receive the sensing data of the reference battery cell from the head slave device of the second battery module.

* * * * *